(12) United States Patent
Wang et al.

(10) Patent No.: US 9,886,121 B2
(45) Date of Patent: Feb. 6, 2018

(54) TOUCH CONTROL DISPLAY PANEL AND TOUCH CONTROL METHOD THEREOF, AND TOUCH CONTROL DISPLAY DEVICE

(71) Applicants: Shanghai AVIC Optoelectronics Co., Ltd., Shanghai (CN); Tianma Micro-Electronics Co., Ltd., Shenzhen (CN)

(72) Inventors: Xiangchun Wang, Shanghai (CN); Xupeng Wang, Shanghai (CN); Zhengyuan Huang, Shanghai (CN); Li Li, Shanghai (CN)

(73) Assignees: SHANGHAI AVIC OPTOELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 131 days.

(21) Appl. No.: 14/719,240

(22) Filed: May 21, 2015

(65) Prior Publication Data

US 2016/0124563 A1 May 5, 2016

(30) Foreign Application Priority Data

Oct. 29, 2014 (CN) .......................... 2014 1 0593775

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/04883* (2013.01); *G06F 2203/04106* (2013.01)

(58) Field of Classification Search
CPC .... G06F 3/0416; G06F 3/044; G06F 3/04883; G06F 2203/04106
(Continued)

(56) References Cited

U.S. PATENT DOCUMENTS

2010/0066698 A1\* 3/2010 Seo ...................... G06F 3/04883
345/173
2011/0057893 A1\* 3/2011 Kim ....................... G06F 3/0412
345/173
(Continued)

FOREIGN PATENT DOCUMENTS

CN 201600668 A 10/2010
CN 103279300 A 9/2013

*Primary Examiner* — Kumar Patel
*Assistant Examiner* — Kuo Woo
(74) *Attorney, Agent, or Firm* — Anova Law Group, PLLC

(57) ABSTRACT

A touch control display panel is disclosed. The touch control display panel includes a display area and a non-display area surrounding the display area. The panel also includes a preliminary touch system having a plurality of preliminary touch electrodes located in at least either of a part of the display area and the non-display area, the preliminary touch system is configured to detect whether there is a touch in at least either of the part of the display area and the non-display area of the touch control display panel. The panel also includes a master touch system having a plurality of master touch electrodes located in the display area. In addition, the master touch electrodes are configured to detect whether there is a touch in the display area.

16 Claims, 15 Drawing Sheets

(51) Int. Cl.
*G06F 3/044* (2006.01)
*G06F 3/0488* (2013.01)

(58) Field of Classification Search
USPC .......................................................... 345/174
See application file for complete search history.

(56) References Cited

U.S. PATENT DOCUMENTS

| | | |
|---|---|---|
| 2011/0193818 A1 | 8/2011 | Chen et al. |
| 2015/0123930 A1* | 5/2015 | Singh .................... G06F 1/3262 345/174 |
| 2015/0287381 A1* | 10/2015 | Kim ........................ G06F 3/044 345/174 |

* cited by examiner

# TOUCH CONTROL DISPLAY PANEL AND TOUCH CONTROL METHOD THEREOF, AND TOUCH CONTROL DISPLAY DEVICE

CROSS-REFERENCES TO RELATED APPLICATIONS

This application claims the benefit of priority to Chinese Patent Application No. 201410593775.4, filed with the Chinese Patent Office on Oct. 29, 2014 and entitled "TOUCH CONTROL DISPLAY PANEL AND A TOUCH CONTROL METHOD THEREOF, AND A TOUCH CONTROL DISPLAY DEVICE", the content of which is incorporated by reference in its entirety.

TECHNICAL FIELD

The present disclosure relates to the field of touch control and particularly to a touch control display panel and a touch control method thereof, and a touch control display device.

BACKGROUND OF THE INVENTION

Touch panels have gradually become common in people's life along with the rapid development of sciences and technologies. The touch panels can be categorized at present into resistive, capacitive, infrared, surface sound wave, electromagnetic, vibration wave inductive, suppressed all-total internal reflection optical inductive, etc., dependent upon their operating principles. Particularly the capacitive touch panels have become popularized recently in the industry due to high sensitivity, a long period of service, high optical transmission ratio and other advantages arising from the unique touch control principle thereof.

BRIEF SUMMARY OF THE INVENTION

One inventive aspect is a touch control display panel. The touch control display panel includes a display area and a non-display area surrounding the display area. The panel also includes a preliminary touch system having a plurality of preliminary touch electrodes located in at least either of a part of the display area and the non-display area, the preliminary touch system is configured to detect whether there is a touch in at least either of the part of the display area and the non-display area of the touch control display panel. The panel also includes a master touch system having a plurality of master touch electrodes located in the display area. In addition, the master touch electrodes are configured to detect whether there is a touch in the display area.

Another inventive aspect is a touch control method of a touch control display panel. touch control display panel includes a display area and a non-display area surrounding the display area. The panel also includes a preliminary touch system having a plurality of preliminary touch electrodes located in at least either of a part of the display area and the non-display area, the preliminary touch system is configured to detect whether there is a touch in at least either of the part of the display area and the non-display area of the touch control display panel. The panel also includes a master touch system having a plurality of master touch electrodes located in the display area. In addition, the master touch electrodes are configured to detect whether there is a touch in the display area. The touch control method includes, when the touch control display panel is started, starting detection by the preliminary touch system. The method also includes, if the preliminary touch system detects a start touch, transmitting, by the preliminary touch system, a trigger signal to the master touch system, starting detection by the master touch system in response to the trigger signal, and if the master touch system detects a touch in the display area, determining by the master touch system a location of the touch.

Another inventive aspect is a touch control display device, including a touch control display panel. The touch control display panel includes a display area and a non-display area surrounding the display area. The panel also includes a preliminary touch system having a plurality of preliminary touch electrodes located in at least either of a part of the display area and the non-display area, the preliminary touch system is configured to detect whether there is a touch in at least either of the part of the display area and the non-display area of the touch control display panel. The panel also includes a master touch system having a plurality of master touch electrodes located in the display area. In addition, the master touch electrodes are configured to detect whether there is a touch in the display area.

DETAILED DESCRIPTION OF THE PREFERRED EMBODIMENTS

Figure 1:
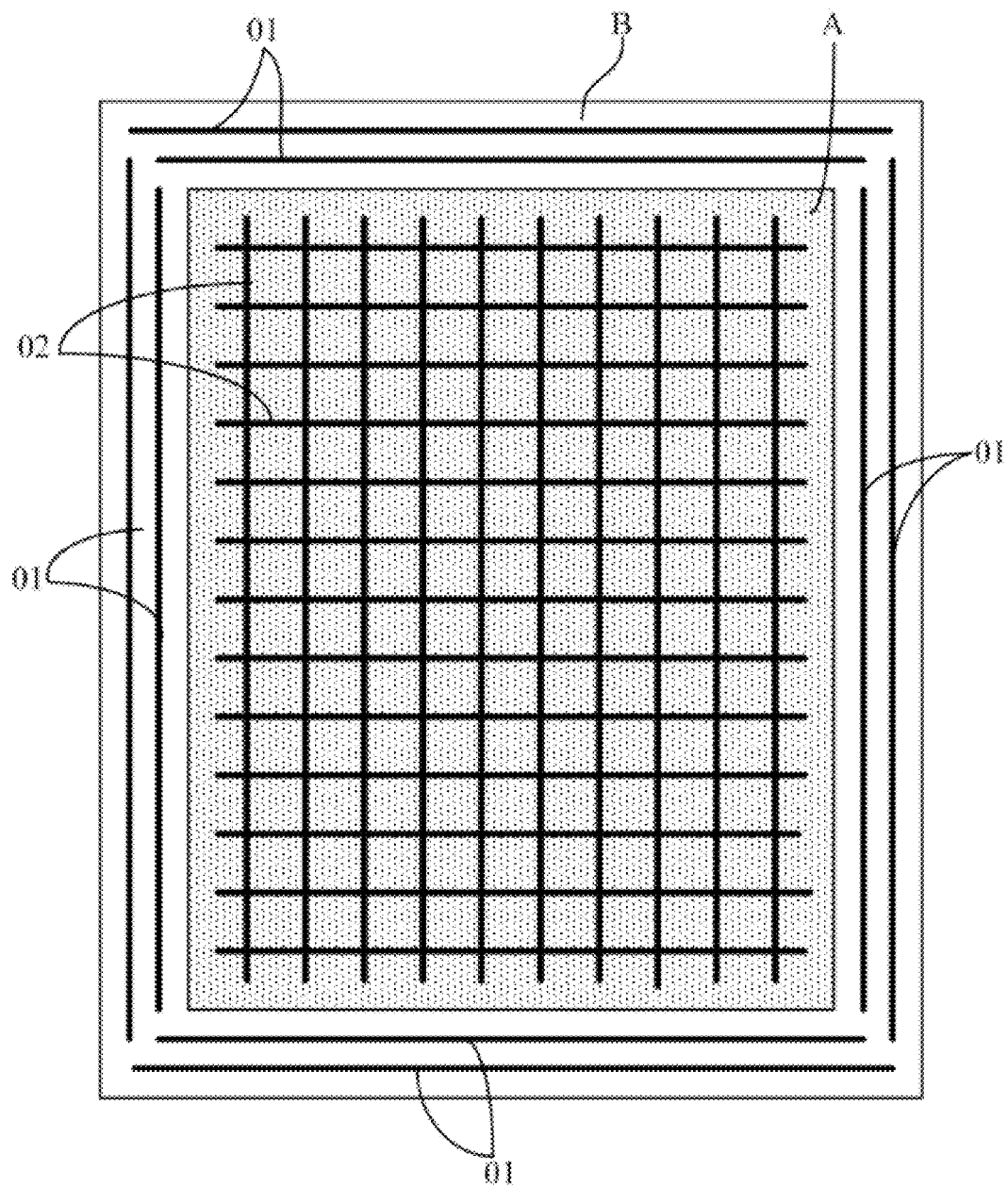
FIG. 1 illustrates a schematic structural diagram of a touch control display panel according to a preferred embodiment of the disclosure in a top view.

The touch control display panel and the touch control method thereof, and the touch control display device, according to the preferred embodiments of the disclosure will be described below in details with reference to the drawings.

The shapes and sizes of respective components in the figures will not reflect their real proportions but are merely intended to schematically illustrate the disclosure.

An embodiment of the disclosure provides a touch control display panel, as illustrated in FIG. 1 to FIG. 12, which is divided into an active display area A and a non-display area B surrounding the display area, and which includes a preliminary touch system and a master touch system, where the preliminary touch system includes preliminary touch electrodes 01, located in at least either of a part of the active display area A and the non-display area B, configured to detect whether there is a touch in the part of the active display area A and/or the non-display area B of the touch control display panel; and the master touch system includes master touch electrodes 02, located in the display area A, configured to detect whether there is a touch in the display area A of the touch control display panel.

The touch control display panel above according to the embodiment of the disclosure includes the preliminary touch system and the master touch system, and the master touch system, as in the prior art, includes the master touch electrodes, located in the display area, configured to detect a touch in the display area of the touch control display panel; and the preliminary touch system includes the preliminary touch electrodes, located in the part of the display area and/or in the non-display area, configured to detect a touch in at least either of the part of the display area and the non-display area of the touch control display panel. Due to a smaller range of detection by, and consequentially low power consumption of, the preliminary touch system, the preliminary touch system and the master control system can operate in cooperation with each other so that after the touch control display panel is started, firstly the preliminary touch system with lower power consumption detects a touch, and the master touch system with higher power consumption will not be started into operation until a touch is detected by the preliminary touch system, thus lowering power consumption of the touch control display panel.

Particularly in order to lower power consumption, in a particular implementation of the touch control display panel above according to the embodiment of the disclosure, the preliminary touch system transmits a trigger signal so that the master touch system starts detection, or the preliminary touch system transmits a stop signal so that the master touch system stops detection.

Furthermore in the touch control display panel above according to the embodiment of the disclosure:

The preliminary touch system is configured to start the preliminary touch electrodes for detection when the touch control display panel is started; and if any one of the preliminary touch electrodes detects a start touch in a zone where the preliminary touch electrode is located, to transmit a trigger signal to the master touch system, and if any one of the preliminary touch electrodes detects a stop touch in a zone where the preliminary touch electrode is located, to transmit a stop signal to the master touch system; and The master touch system is configured to start the master touch electrodes for detection upon reception of the trigger signal transmitted by the preliminary touch system; if any one of the master touch electrodes detects a touch in the display area, to determine the location of the touch; and to stop detection by the detecting master touch electrodes upon reception of the stop signal transmitted by the preliminary touch system.

Furthermore in the touch control display panel above according to the embodiment of the disclosure, the preliminary touch system can be embodied as a simple self-capacitive touch system easy to implement, that is, the preliminary touch electrodes are configured as self-capacitive electrodes, and when the body of a person does not touch the touch control display panel, capacitances borne by the self-capacitive electrodes are constant values, and when the body of the person gradually approaches the touch control display panel, the capacitances borne by the corresponding self-capacitive electrodes are the constant values to which a capacitance of the body of the person is added, and the preliminary touch system can judge the location of the touch by detecting variances in capacitances of the respective self-capacitive electrodes.

Different implementations of the touch control display panel above will be described below in details with reference to particular embodiments thereof.

A preferred embodiment of the disclosure provides a touch control display panel, as illustrated in FIG. 1, which is divided into a display area A and a non-display area B surrounding the display area, and which includes a preliminary touch system and a master touch system, where the preliminary touch system includes preliminary touch electrodes 01, located in at least either of a part of the active display area A and the non-display area B, configured to detect whether there is a touch in at least either of the part of the active display area A and the non-display area B of the touch control display panel; and the master touch system includes master touch electrodes 02, located in the display area A, configured to detect whether there is a touch in the display area A of the touch control display panel. Particularly as illustrated in FIG. 1, the preliminary touch system includes at least two preliminary touch electrodes 01 located on respective upper, lower, left and right sides of the non-display area B, where the preliminary touch electrodes 01 on the respective sides are parallel to and insulated from the corresponding sides; and the preliminary touch electrodes 01 are self-capacitive electrodes.

Thus when the touch control display panel is started, the preliminary touch electrodes start detection; if any one of the preliminary touch electrodes detects a start touch in a zone where the preliminary touch electrode is located, that is, there are firstly a variation in capacitance on one of the preliminary touch electrodes located outside the non-display area and then a variation in capacitance on one of the preliminary touch electrodes located inside the non-display area, then the preliminary touch system transmits a trigger signal to the master touch system; the master touch electrodes start detection upon reception of the touch signal transmitted by the preliminary touch system; if any one of the master control electrodes detects a touch in the display area, then the location of the touch is determined; while the master touch electrodes are detecting, if any one of the preliminary touch electrodes detects a stop touch in a zone where the preliminary touch electrode is located, that is, there are firstly a variation in capacitance on one of the preliminary touch electrodes located inside the non-display area and then a variation in capacitance on one of the preliminary touch electrodes located outside the non-display area, then the preliminary touch system transmits a stop signal to the master touch system; and the master touch electrodes stop detection after the master touch system receives the stop signal transmitted by the preliminary touch system. Thus in the embodiment of the disclosure, the preliminary touch system and the master control system can operate in cooperation with each other so that after the touch control display panel is started, firstly the preliminary touch system with lower power consumption detects a touch, and the master touch system with higher power consumption will not be started into operation until a touch is detected by the preliminary touch system, thus lowering power consumption of the touch control display panel.

Particularly in the touch control display panel illustrated in FIG. 1, the preliminary touch system judges a start touch and a stop touch dependent upon the order in which the capacitances on the preliminary touch electrodes inside and outside the non-display area vary. The touch control display panel is easy to implement and has a less requirement on a drive IC of the preliminary touch system, thus avoiding the display area of the touch control display panel from being occupied.

Figure 2:
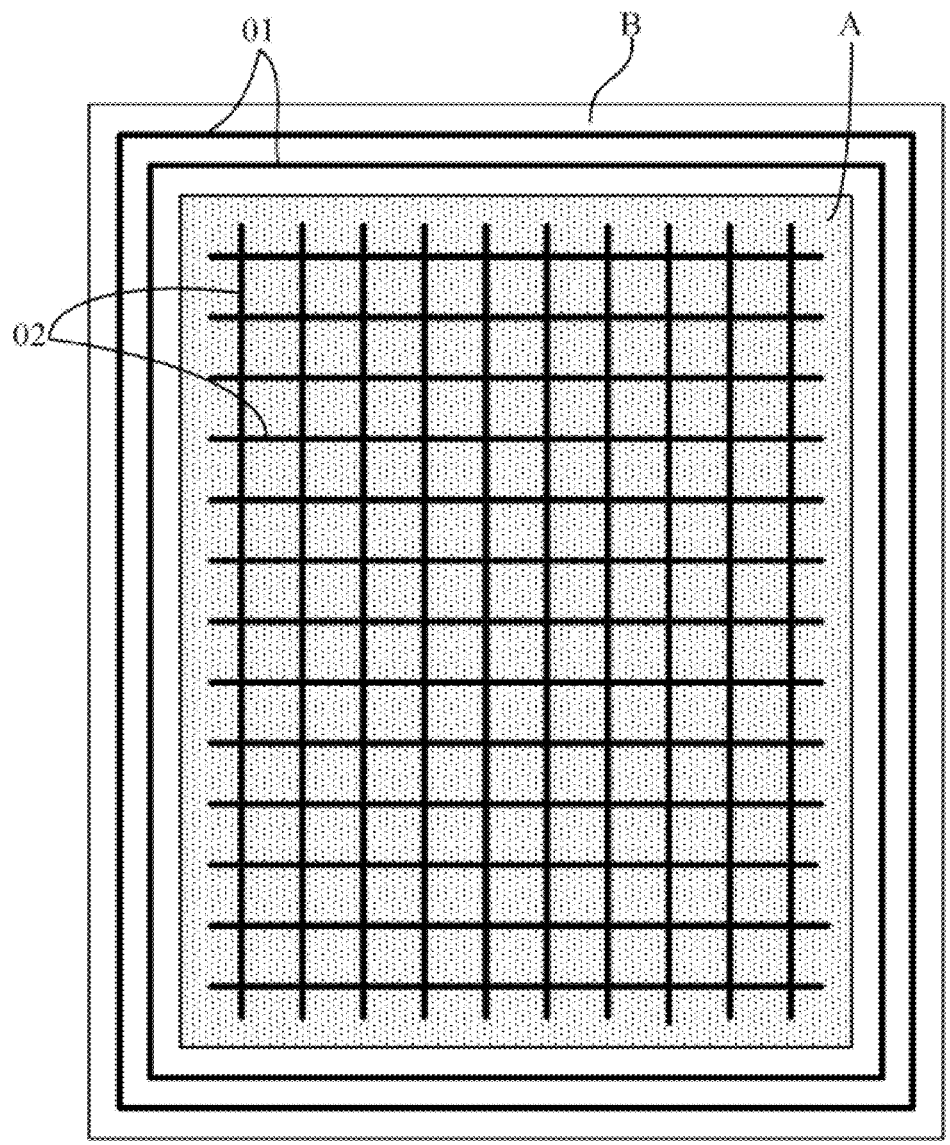
FIG. 2 illustrates a schematic structural diagram of a touch control display panel according to another preferred embodiment of the disclosure in a top view.

The preliminary touch system can be embodied in location or shape in numerous implementations, and as illustrated in FIG. 2, another preferred embodiment of the disclosure provides a touch control display panel including the preliminary touch system including at least two looped preliminary touch electrodes 01, which are self-capacitive electrodes, located in the non-display area B and surrounding the display area A.

An operating principle of the touch control display panel illustrated in FIG. 2 is substantially the same as that of the touch control display panel according to the embodiment illustrated in FIG. 1 above, so a detailed description thereof will be omitted here. Furthermore in the touch control display panel illustrated in FIG. 2, the touch system also judges a start touch and a stop touch dependent upon the order in which the capacitances on the preliminary touch electrodes inside and outside the non-display area vary, particularly under the substantially same judgment principle as that of the touch control display panel according to the embodiment illustrated in FIG. 1 above, so a detailed description thereof will be omitted here. As can be apparent, the touch control display panel illustrated in FIG. 2 is easy to implement and has a less requirement on a drive IC of the preliminary touch system, thus avoiding the display area of the touch control display panel from being occupied.

Figure 3:
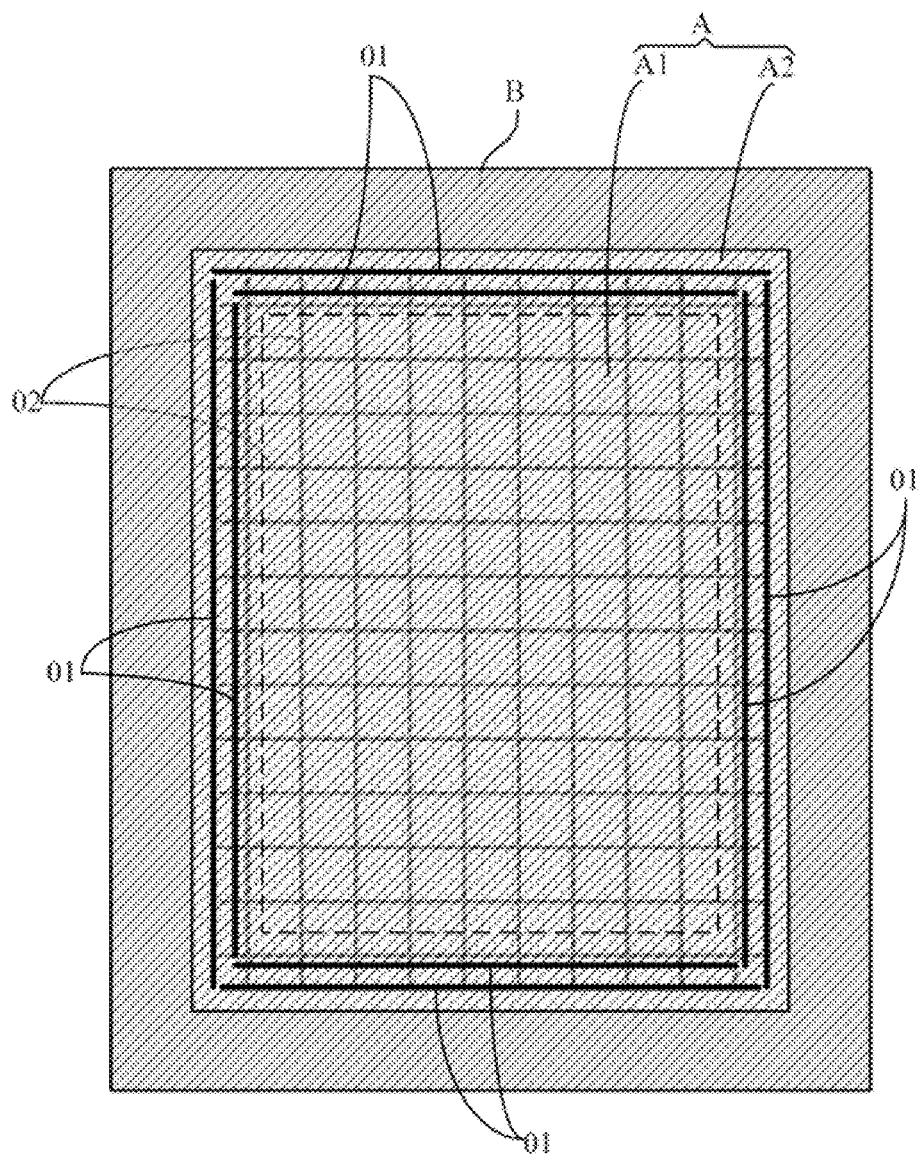
FIG. 3 illustrates a schematic structural diagram of a touch control display panel according to another preferred embodiment of the disclosure in a top view.

As illustrated in FIG. 3, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch system includes at least two preliminary touch electrodes 01 located on respective upper, lower, left and right sides of the peripheral area A2, where the preliminary touch electrodes 01 on the respective sides are parallel to and insulated from the corresponding sides; and the preliminary touch electrodes 01 are self-capacitive electrodes.

Particularly an operating principle of the touch control display panel illustrated in FIG. 3 is substantially the same as that of the touch control display panel according to the embodiment illustrated in FIG. 1 above, so a detailed description thereof will be omitted here. Furthermore in the touch control display panel illustrated in FIG. 3, when there is a start touch, there are firstly a variation in capacitance on one of the preliminary touch electrodes located outside the peripheral area and then a variation in capacitance on one of the preliminary touch electrodes located inside the peripheral area; and when there is a stop touch, there are firstly a variation in capacitance on one of the preliminary touch electrodes located inside the peripheral area and then a variation in capacitance on one of the preliminary touch electrodes located outside the peripheral area, so a start touch and a stop touch can be judged dependent upon the order in which the capacitances on the preliminary touch electrodes inside and outside the peripheral area vary. The touch control display panel is easy to implement and has a less requirement on a drive IC of the preliminary touch system, thus avoiding the display area of the touch control display panel from being occupied. However in this embodiment, since the preliminary touch electrodes are located in the display area, the preliminary touch electrodes are insulated from the master touch electrodes so as to avoid an influence of the preliminary touch electrode upon the master touch electrodes. In a particular implementation, the preliminary touch electrode can be built in the touch control display panel or can be prepared separately and then assembled together with an existing touch control display panel into the touch control display panel above according to the embodiment of the disclosure.

Figure 4:
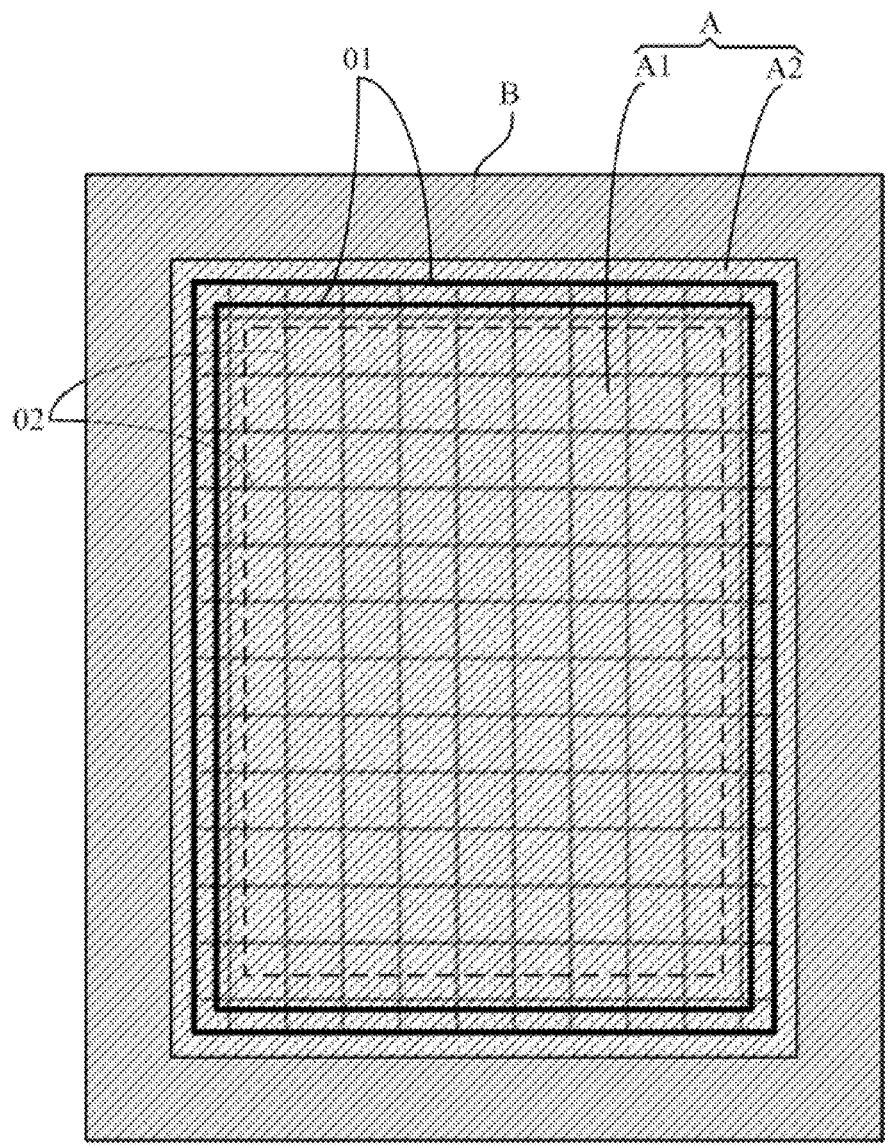
FIG. 4 illustrates a schematic structural diagram of a touch control display panel according to another preferred embodiment of the disclosure in a top view.

As illustrated in FIG. 4, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch system includes at least two looped preliminary touch electrodes 01 located in the peripheral area A2 and surrounding the central area A1; and the preliminary touch electrodes 01 are self-capacitive electrodes.

Particularly an operating principle of the touch control display panel illustrated in FIG. 4 is substantially the same as that of the touch control display panel according to the embodiment illustrated in FIG. 1 above, so a detailed description thereof will be omitted here. Furthermore in the touch control display panel illustrated in FIG. 4, the touch system also judges a start touch and a stop touch dependent upon the order in which the capacitances on the preliminary touch electrodes inside and outside the peripheral area vary, particularly under the substantially same judgment principle as that of the touch control display panel according to the embodiment illustrated in FIG. 3 above, so a detailed description thereof will be omitted here. As can be apparent, the touch control display panel illustrated in FIG. 4 is easy to implement and has a less requirement on a drive IC of the preliminary touch system, thus avoiding the display area of the touch control display panel from being occupied. However in this embodiment, since the preliminary touch electrodes are located in the display area, the preliminary touch electrodes are insulated from the master touch electrodes so as to avoid an influence of the preliminary touch electrode upon the master touch electrodes. In a particular implementation, the preliminary touch electrode can be built in the touch control display panel or can be prepared separately and then assembled together with an existing touch control display panel into the touch control display panel above according to the embodiment of the disclosure.

Figure 5:
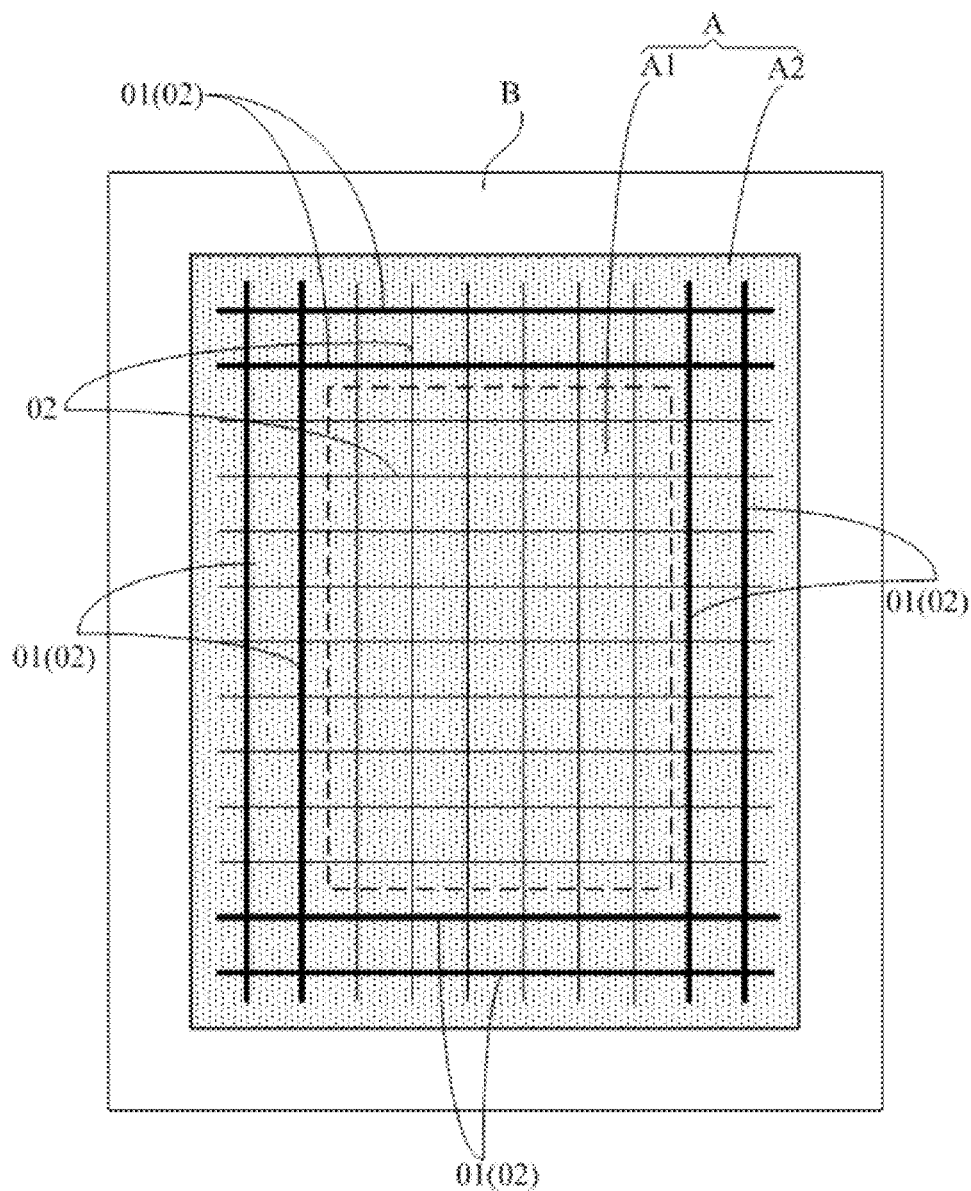
FIG. 5 illustrates a schematic structural diagram of a touch control display panel according to another preferred embodiment of the disclosure in a top view.

As illustrated in FIG. 5, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch system includes preliminary touch electrodes 01 consisted of at least two columns of master touch electrodes 02 located on respective upper, lower, left and right sides of the peripheral area A2 and parallel to the corresponding sides; and before the master touch system is started into operation, the preliminary touch electrodes 01 are self-capacitive electrodes. That is, the master touch electrodes serve as the preliminary touch electrodes so that a process of preparing separately the preliminary touch electrodes can be dispensed with to thereby lower a cost.

Particularly an operating principle of the touch control display panel illustrated in FIG. 5 is substantially the same as that of the touch control display panel according to the embodiment illustrated in FIG. 1 above, so a detailed description thereof will be omitted here. Furthermore in the touch control display panel illustrated in FIG. 5, the touch system also judges a start touch and a stop touch dependent upon the order in which the capacitances on the preliminary touch electrodes inside and outside the peripheral area vary, particularly under the substantially same judgment principle as that of the touch control display panel according to the embodiment illustrated in FIG. 3 above, so a detailed description thereof will be omitted here. As can be apparent, the touch control display panel illustrated in FIG. 5 is easy to implement and has a less requirement on a drive IC of the preliminary touch system, thus avoiding the display area of the touch control display panel from being occupied.

It shall be further noted that the touch control display panel illustrated in FIG. 5 includes the master touch electrodes which are mutual-capacitive electrodes, and particularly in operation, the master touch electrodes 02 serving as the preliminary touch electrode 01 are self-capacitive electrodes before the master control system is started into operation, but are still mutual-capacitive electrodes after the master control system is started into operation.

Figure 6:
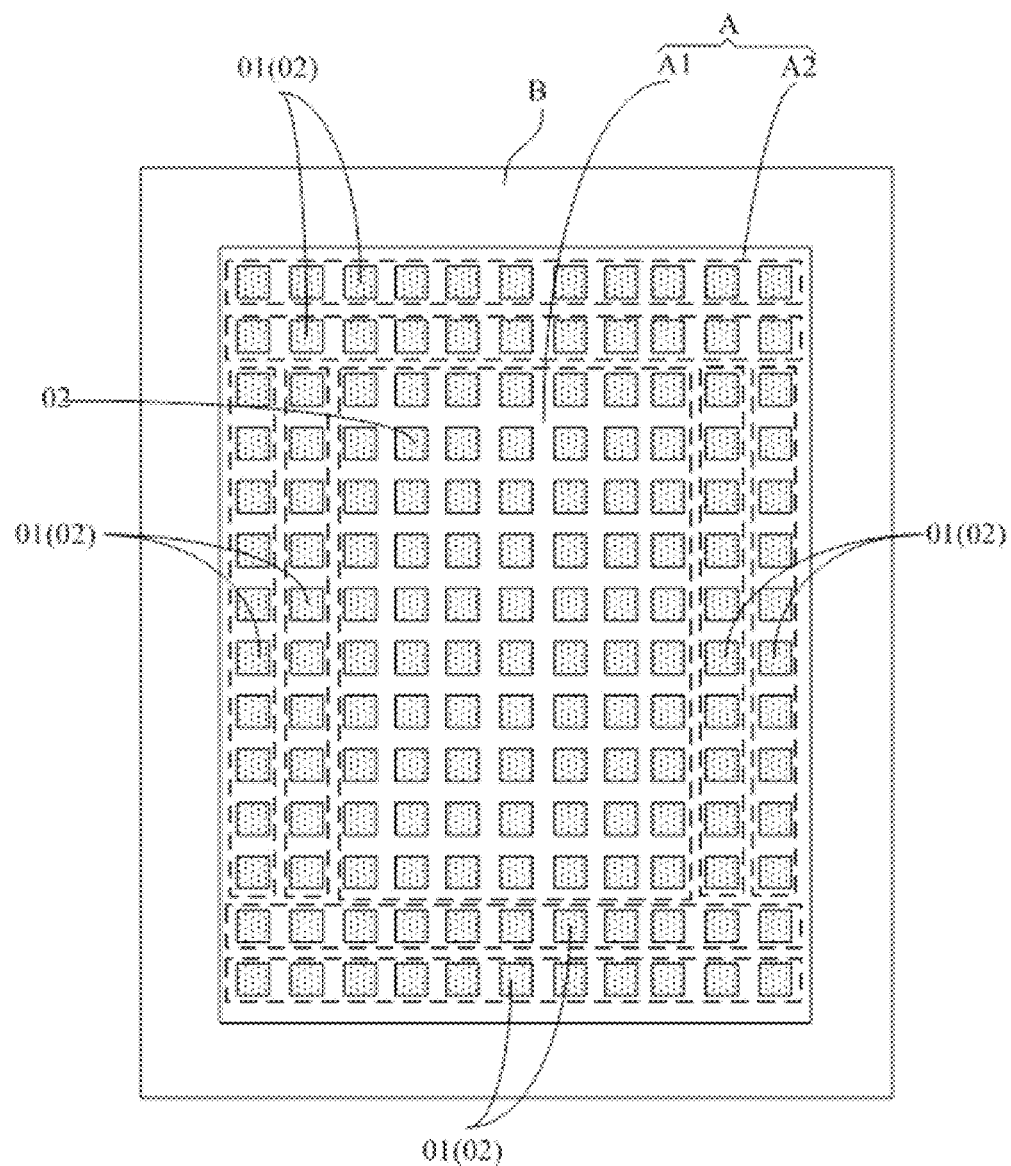
FIG. 6 illustrates a schematic structural diagram of a touch control display panel according to another preferred embodiment of the disclosure in a top view.

The touch control display panel can alternatively include the master touch electrodes which are mutual-capacitive electrodes, and as illustrated in FIG. 6, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch system includes preliminary touch electrodes 01 consisted of at least two columns of master touch electrodes 02 located on respective upper, lower, left and right sides of the peripheral area A2 and parallel to the corresponding sides; and before the master touch system is started into operation, the preliminary touch electrodes 01 are self-capacitive electrodes. That is, the master touch electrodes serve as the preliminary touch electrodes so that a process of preparing separately the preliminary touch electrodes can be dispensed with to thereby lower a cost.

Particularly an operating principle of the touch control display panel illustrated in FIG. 6 is substantially the same as that of the touch control display panel according to the embodiment illustrated in FIG. 1 above, so a detailed description thereof will be omitted here. Furthermore in the touch control display panel illustrated in FIG. 6, the touch system also judges a start touch and a stop touch dependent upon the order in which the capacitances on the preliminary touch electrodes inside and outside the peripheral area vary, particularly under the substantially same judgment principle as that of the touch control display panel according to the embodiment illustrated in FIG. 3 above, so a detailed description thereof will be omitted here. As can be apparent, the touch control display panel illustrated in FIG. 6 is easy to implement and has a less requirement on a drive IC of the preliminary touch system, thus avoiding the display area of the touch control display panel from being occupied.

It shall be noted that the touch control display panel illustrated in FIG. 6 includes the master touch electrodes which are mutual-capacitive electrodes, so particularly in operation, the master touch electrodes 02 serving the preliminary touch electrodes 01 are self-capacitive electrodes all the time.

The embodiments illustrated in FIG. 1 to FIG. 6 above relate to the preliminary touch electrodes in the preliminary touch system in the touch control display panel, all of which are located in the non-display area or in the display area. Of course, in a particular implementation, alternatively a part of the preliminary touch electrodes in the preliminary touch system can be located in the non-display area and the other part thereof can be located in the display area.

Figure 7:
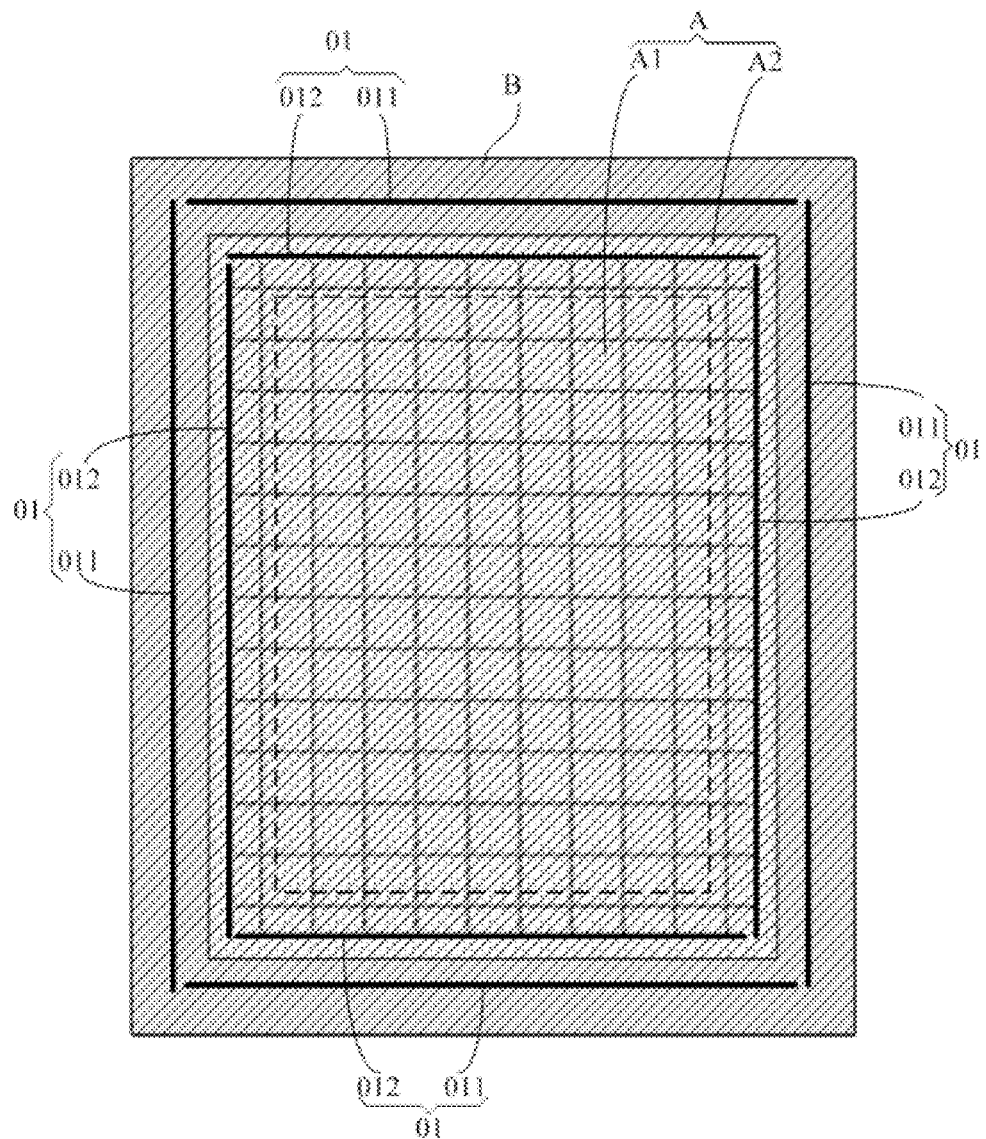
FIG. 7 illustrates a schematic structural diagram of a touch control display panel according to another preferred embodiment of the disclosure in a top view.

As illustrated in FIG. 7, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one first preliminary touch electrodes 011, which are self-capacitive electrodes, located on respective upper, lower, left and right sides of the non-display area B and parallel to the corresponding sides, and At least one second preliminary touch electrodes 012, which are self-capacitive electrodes, located on respective upper, lower, left and right sides of the peripheral area A2 and parallel to the corresponding sides.

Particularly an operating principle of the touch control display panel illustrated in FIG. 7 is substantially the same as that of the touch control display panel according to the embodiment illustrated in FIG. 1 above, so a detailed description thereof will be omitted here. Furthermore in the touch control display panel illustrated in FIG. 7, when there is a start touch, there are firstly a variation in capacitance on one of the first preliminary touch electrodes located in the non-display area and then a variation in capacitance on one of the second preliminary touch electrodes located in the peripheral area; and when there is a stop touch, there are firstly a variation in capacitance on one of the second preliminary touch electrodes located in the peripheral area and then a variation in capacitance on one of the first preliminary touch electrodes located in the non-display area, so a start touch and a stop touch can be judged dependent upon the order in which the capacitances on the first and second preliminary touch electrodes vary. The touch control display panel is easy to implement and has a less requirement on a drive IC of the preliminary touch system, thus avoiding the display area of the touch control display panel from being occupied.

Figure 8:
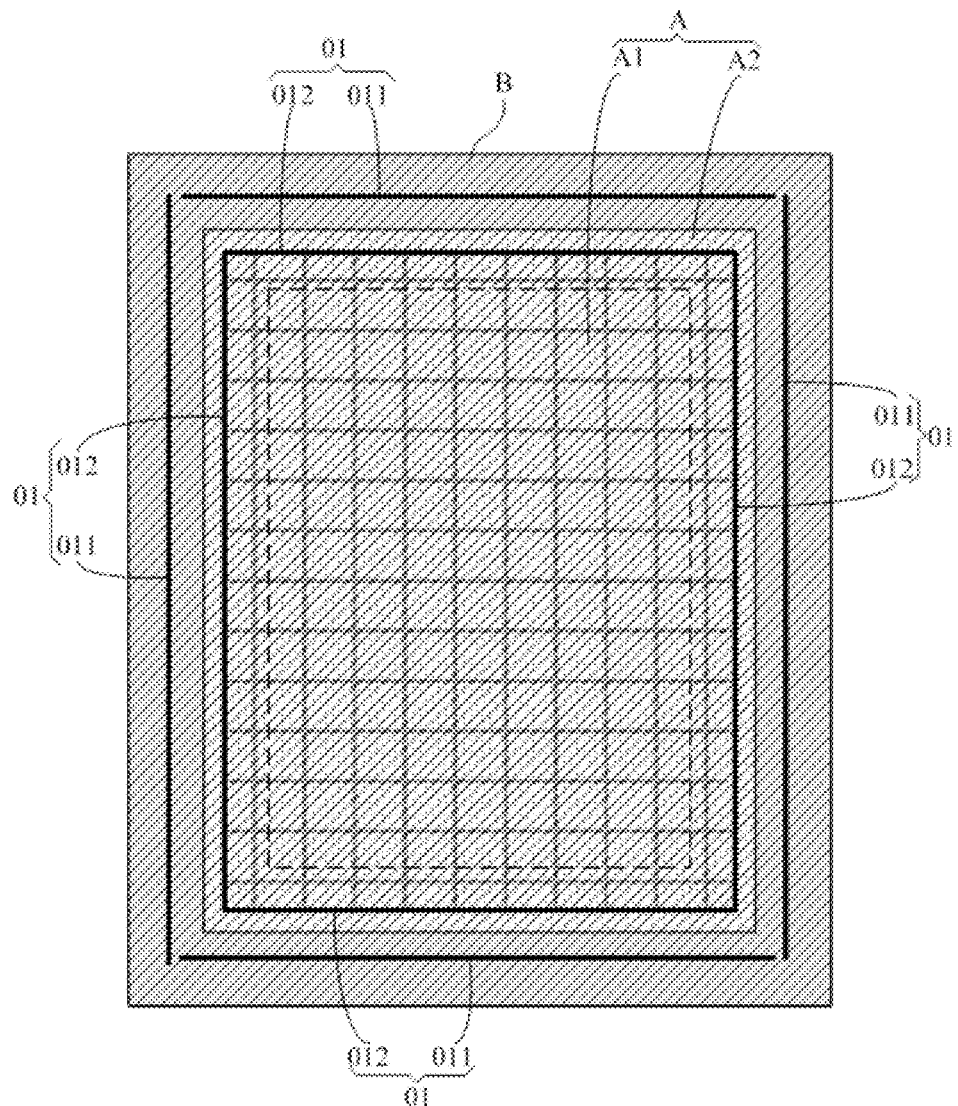
FIG. 8 illustrates a schematic structural diagram of a touch control display panel according to another preferred embodiment of the disclosure in a top view.

As illustrated in FIG. 8, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one first preliminary touch electrodes 011, which are self-capacitive electrodes, located on respective upper, lower, left and right sides of the non-display area B and parallel to the corresponding sides, and At least one looped second preliminary touch electrode 012, which is a self-capacitive electrode, located in the peripheral area A2 and surrounding the central area A1.

Particularly an operating principle of the touch control display panel illustrated in FIG. 8 is substantially the same as that of the touch control display panel according to the embodiment illustrated in FIG. 1 above, so a detailed description thereof will be omitted here. Furthermore in the touch control display panel illustrated in FIG. 8, the touch system also judges a start touch and a stop touch dependent upon the order in which the capacitances on the first and second preliminary touch electrodes vary, particularly under the substantially same judgment principle as that of the touch control display panel according to the embodiment illustrated in FIG. 7 above, so a detailed description thereof will be omitted here. As can be apparent, the touch control display panel illustrated in FIG. 8 is easy to implement and has a less requirement on a drive IC of the preliminary touch system, thus avoiding the display area of the touch control display panel from being occupied.

Figure 9:
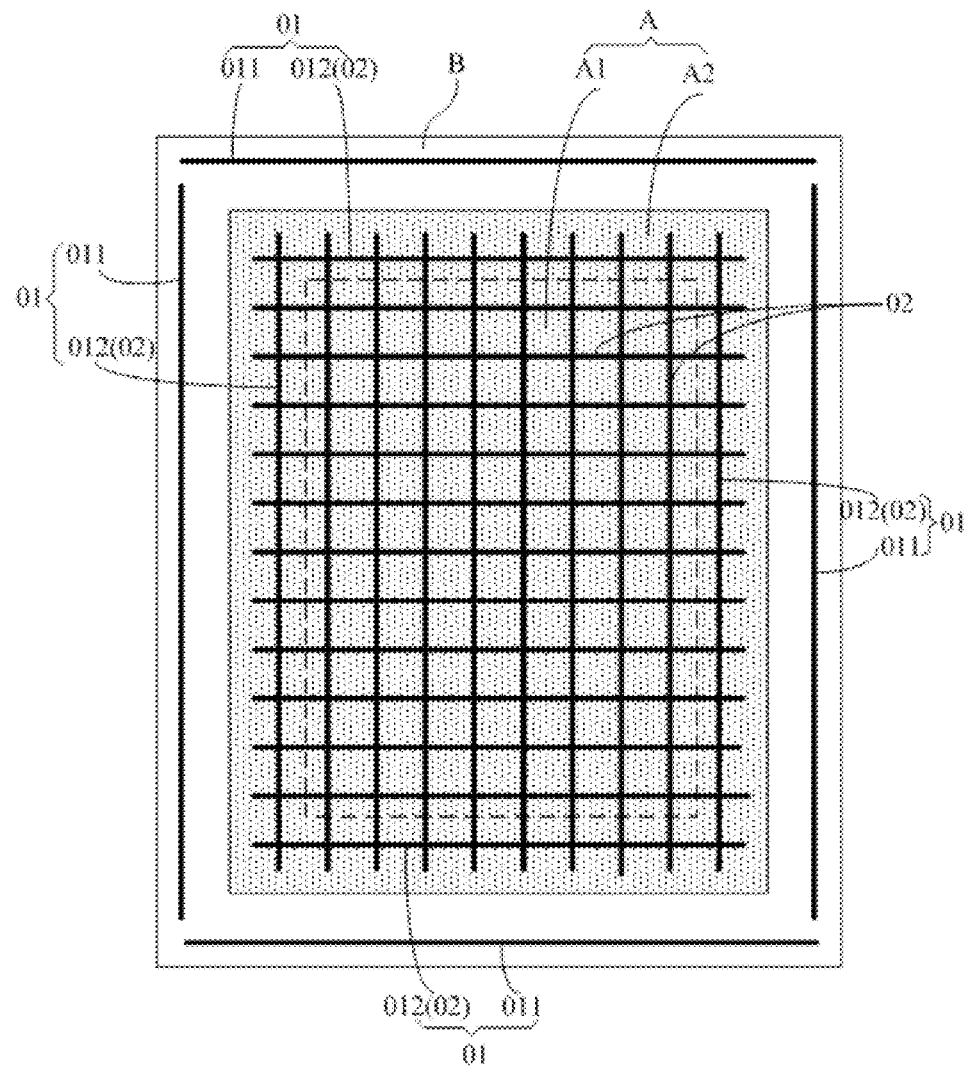
FIG. 9 illustrates a schematic structural diagram of a touch control display panel according to another preferred embodiment of the disclosure in a top view.

As illustrated in FIG. 9, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one first preliminary touch electrodes 011, which are self-capacitive electrodes, located on respective upper, lower, left and right sides of the non-display area B and parallel to the corresponding sides, and Second preliminary touch electrodes 012 consisted of at least one columns of master touch electrodes 02 located on respective upper, lower, left and right sides of the peripheral area A2 and parallel to the corresponding sides, where before the master touch system is started into operation, the second preliminary touch electrodes 012 are self-capacitive electrodes.

Particularly an operating principle of the touch control display panel illustrated in FIG. 9 is substantially the same as that of the touch control display panel according to the embodiment illustrated in FIG. 1 above, so a detailed description thereof will be omitted here. Furthermore in the touch control display panel illustrated in FIG. 9, the touch system also judges a start touch and a stop touch dependent upon the order in which the capacitances on the first and second preliminary touch electrodes vary, particularly under the substantially same judgment principle as that of the touch control display panel according to the embodiment illustrated in FIG. 7 above, so a detailed description thereof will be omitted here. As can be apparent, the touch control display panel illustrated in FIG. 9 is easy to implement and has a less requirement on a drive IC of the preliminary touch system, thus avoiding the display area of the touch control display panel from being occupied.

Figure 10:
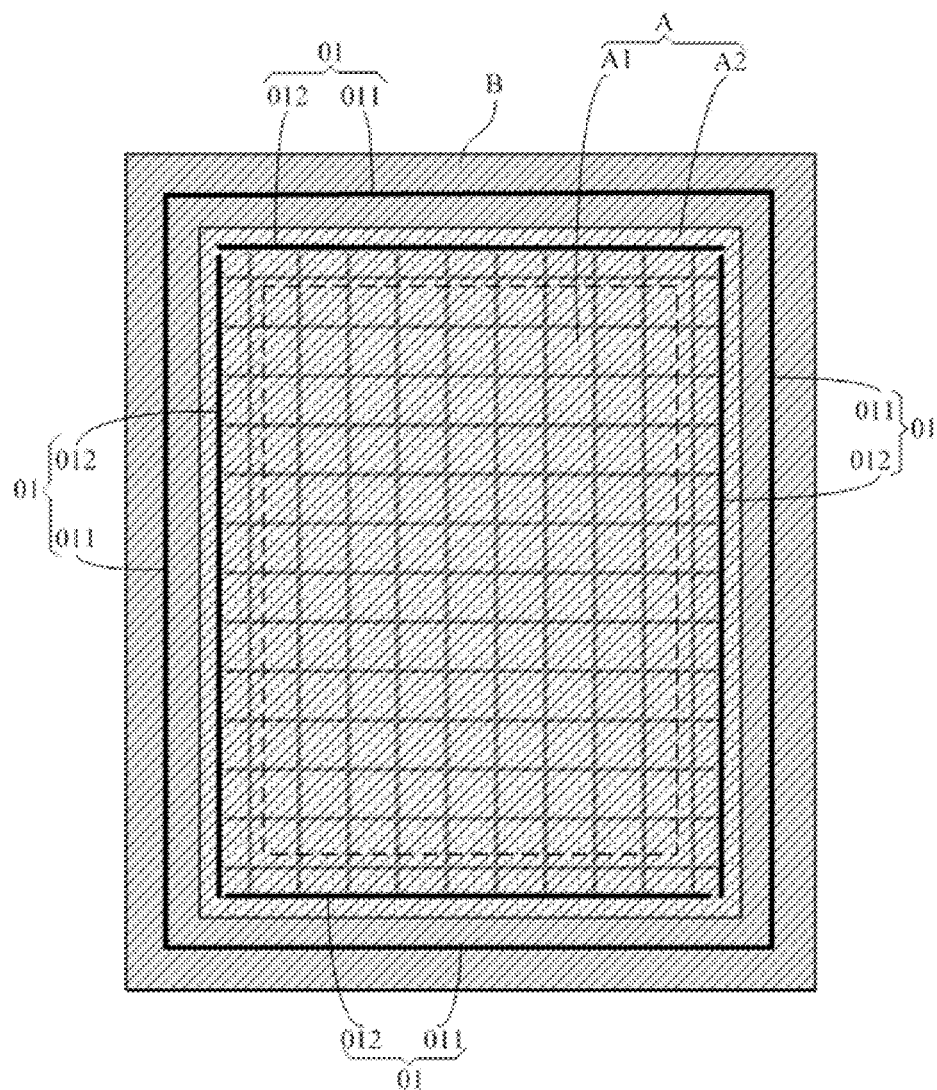
FIG. 10 illustrates a schematic structural diagram of a touch control display panel according to another preferred embodiment of the disclosure in a top view.

As illustrated in FIG. 10, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one looped first preliminary touch electrode 011, which is a self-capacitive electrode, located in the non-display area B and surrounding the display area A, and At least one second preliminary touch electrodes 012, which are self-capacitive electrodes, located on respective upper, lower, left and right sides of the peripheral area A2 and parallel to the corresponding sides.

Particularly an operating principle of the touch control display panel illustrated in FIG. 10 is substantially the same as that of the touch control display panel according to the embodiment illustrated in FIG. 1 above, so a detailed description thereof will be omitted here. Furthermore in the touch control display panel illustrated in FIG. 10, the touch system also judges a start touch and a stop touch dependent upon the order in which the capacitances on the first and second preliminary touch electrodes vary, particularly under the substantially same judgment principle as that of the touch control display panel according to the embodiment illustrated in FIG. 7 above, so a detailed description thereof will be omitted here. As can be apparent, the touch control display panel illustrated in FIG. 10 is easy to implement and has a less requirement on a drive IC of the preliminary touch system, thus avoiding the display area of the touch control display panel from being occupied.

Figure 11:
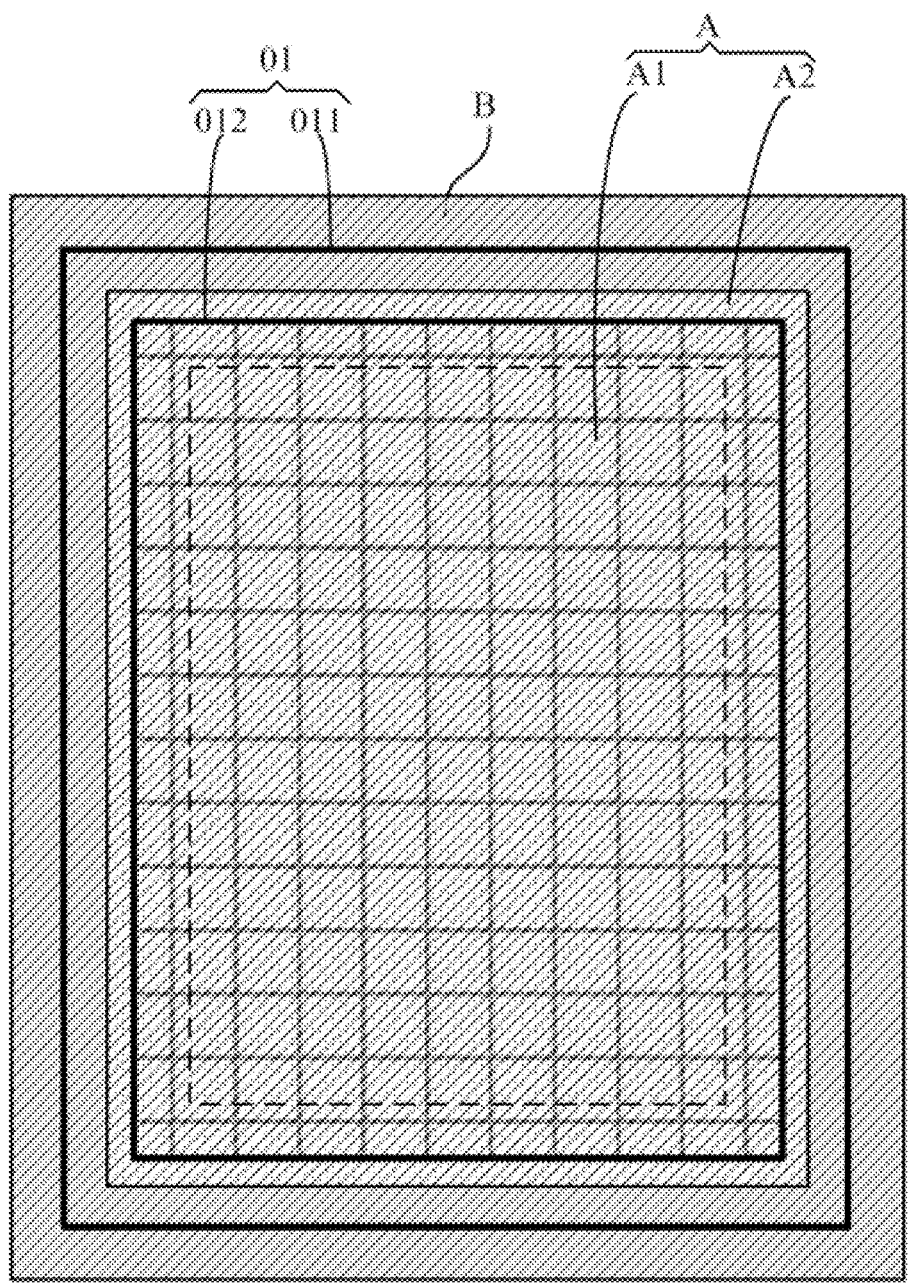
FIG. 11 illustrates a schematic structural diagram of a touch control display panel according to another preferred embodiment of the disclosure in a top view.

As illustrated in FIG. 11, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one looped first preliminary touch electrode 011, which is a self-capacitive electrode, located in the non-display area B and surrounding the display area A, and At least one looped second preliminary touch electrode 012, which is a self-capacitive electrode, located in the peripheral area A2 and surrounding the central area A1.

Particularly an operating principle of the touch control display panel illustrated in FIG. 11 is substantially the same as that of the touch control display panel according to the embodiment illustrated in FIG. 1 above, so a detailed description thereof will be omitted here. Furthermore in the touch control display panel illustrated in FIG. 11, the touch system also judges a start touch and a stop touch dependent upon the order in which the capacitances on the first and second preliminary touch electrodes vary, particularly under the substantially same judgment principle as that of the touch control display panel according to the embodiment illustrated in FIG. 7 above, so a detailed description thereof will be omitted here. As can be apparent, the touch control display panel illustrated in FIG. 11 is easy to implement and has a less requirement on a drive IC of the preliminary touch system, thus avoiding the display area of the touch control display panel from being occupied.

Figure 12:
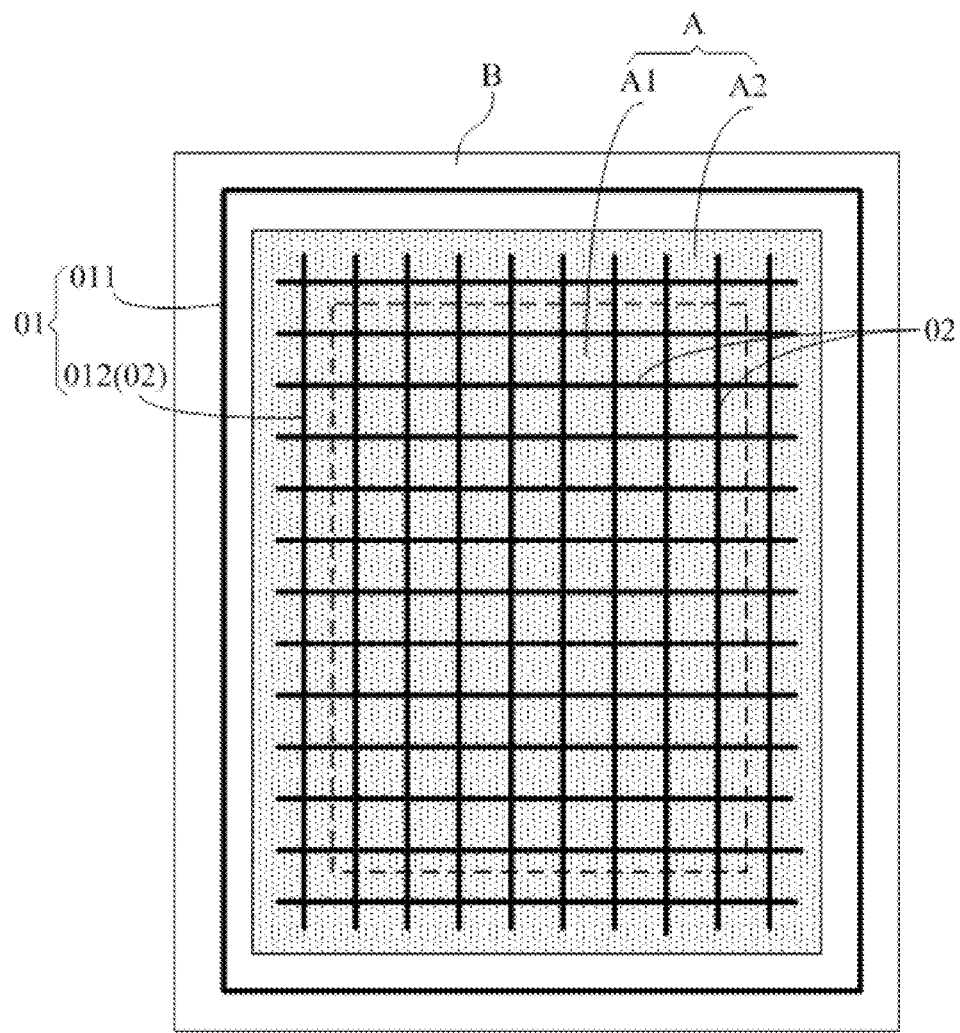
FIG. 12 illustrates a schematic structural diagram of a touch control display panel according to another preferred embodiment of the disclosure in a top view.

As illustrated in FIG. 12, another preferred embodiment of the disclosure provides a touch control display panel including the display area A divided into a central area A1 (an area surrounded by a dotted frame as illustrated) and a peripheral area A2 surrounding the central area A1, where a part of the display area A is the peripheral area A2; and The preliminary touch electrodes 01 include first preliminary touch electrodes 011 and second preliminary touch electrodes 012, and the preliminary touch system includes at least one looped first preliminary touch electrode 011, which is a self-capacitive electrode, located in the non-display area B and surrounding the display area A, and Second preliminary touch electrodes 012 consisted of at least one columns of master touch electrodes 02 located on respective upper, lower, left and right sides of the peripheral area A2 and parallel to the corresponding sides, where before the master touch system is started into operation, the second preliminary touch electrodes 012 are self-capacitive electrodes.

Particularly an operating principle of the touch control display panel illustrated in FIG. 12 is substantially the same as that of the touch control display panel according to the embodiment illustrated in FIG. 1 above, so a detailed description thereof will be omitted here. Furthermore in the touch control display panel illustrated in FIG. 12, the touch system also judges a start touch and a stop touch dependent upon the order in which the capacitances on the first and second preliminary touch electrodes vary, particularly under the substantially same judgment principle as that of the touch control display panel according to the embodiment illustrated in FIG. 7 above, so a detailed description thereof will be omitted here. As can be apparent, the touch control display panel illustrated in FIG. 12 is easy to implement and has a less requirement on a drive IC of the preliminary touch system, thus avoiding the display area of the touch control display panel from being occupied.

It shall be noted that in the touch control display panel above according to the embodiments of the disclosure, the display area is divided into the central area and the peripheral area as required particularly in reality. Preferably the peripheral area refers to an area proximate to edges of the display area, and the central area refers to the other display area other the peripheral area.

Figure 13:
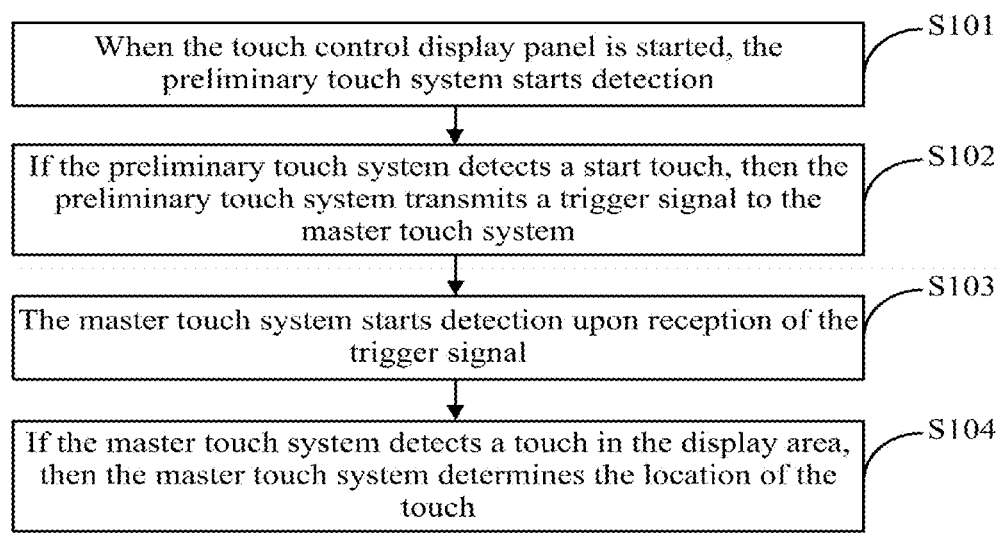
FIG. 13 illustrates a schematic flow chart of a touch control method of a touch control display panel according to another preferred embodiment of the disclosure.

Based upon the same inventive idea, another preferred embodiment of the disclosure provides a touch control method of the touch control display panel above, and as illustrated in FIG. 13, the touch method can include the following operations:

S101. When the touch control display panel is started, the preliminary touch system starts detection;

S102. If the preliminary touch system detects a start touch, then the preliminary touch system transmits a trigger signal to the master touch system;

S103. The master touch system starts detection upon reception of the trigger signal; and S104. If the master touch system detects a touch in the display area, then the master touch system determines the location of the touch.

In the touch control method above according to the embodiment of the disclosure, the touch control display panel includes the preliminary touch system and the master control system, and after the touch control display panel is started, firstly the preliminary touch system with lower power consumption operates, and then the master touch system with higher power consumption will not be started into operation until a touch is detected by the preliminary touch system, thus greatly lowering power consumption of the touch control display panel as compared with the prior art where the master touch system is started into operation immediately when the touch control display panel is started.

Preferably in order to detect a touch on the touch control display panel all the time after the touch control display panel is started, the touch control method above according to the embodiment of the disclosure can further include: the preliminary touch system starts detection from the touch control display panel being started until the touch control display panel is powered off.

Furthermore in order to further lower power consumption of the touch control display panel, the touch control method above according to the embodiment of the disclosure can further include: detection is stopped if the master touch system detects no touch in the display area.

Furthermore in order to further lower power consumption of the touch control display panel, the touch control method above according to the embodiment of the disclosure can further include: while the master touch system is detecting, a stop signal is transmitted to the master touch system when the preliminary touch system detects a touch in a zone where one of the preliminary touch electrodes is located; and the master touch system stops detection upon reception of the stop signal transmitted by the preliminary touch system.

Preferably in the touch control method above according to the embodiment of the disclosure, the preliminary touch electrodes are located in the non-display area; and the start touch is a touch sliding from outside to inside the non-display area; or The preliminary touch electrodes are located in the display area; and the start touch is a touch sliding from outside to inside the peripheral area; or The preliminary touch electrodes are located in the non-display area, and the peripheral area of the display area; and the start touch is a touch sliding from outside the non-display area to inside the peripheral area.

Preferably in the touch control method above according to the embodiment of the disclosure, the preliminary touch electrodes are located in the non-display area; and the stop touch is a touch sliding from inside to outside the non-display area; or The preliminary touch electrodes are located in the display area; and the stop touch is a touch sliding from inside to outside the peripheral area; or The preliminary touch electrodes are located in the non-display area, and the peripheral area of the display area; and the stop touch is a touch sliding from inside the non-display area to outside the peripheral area.

Figure 14:
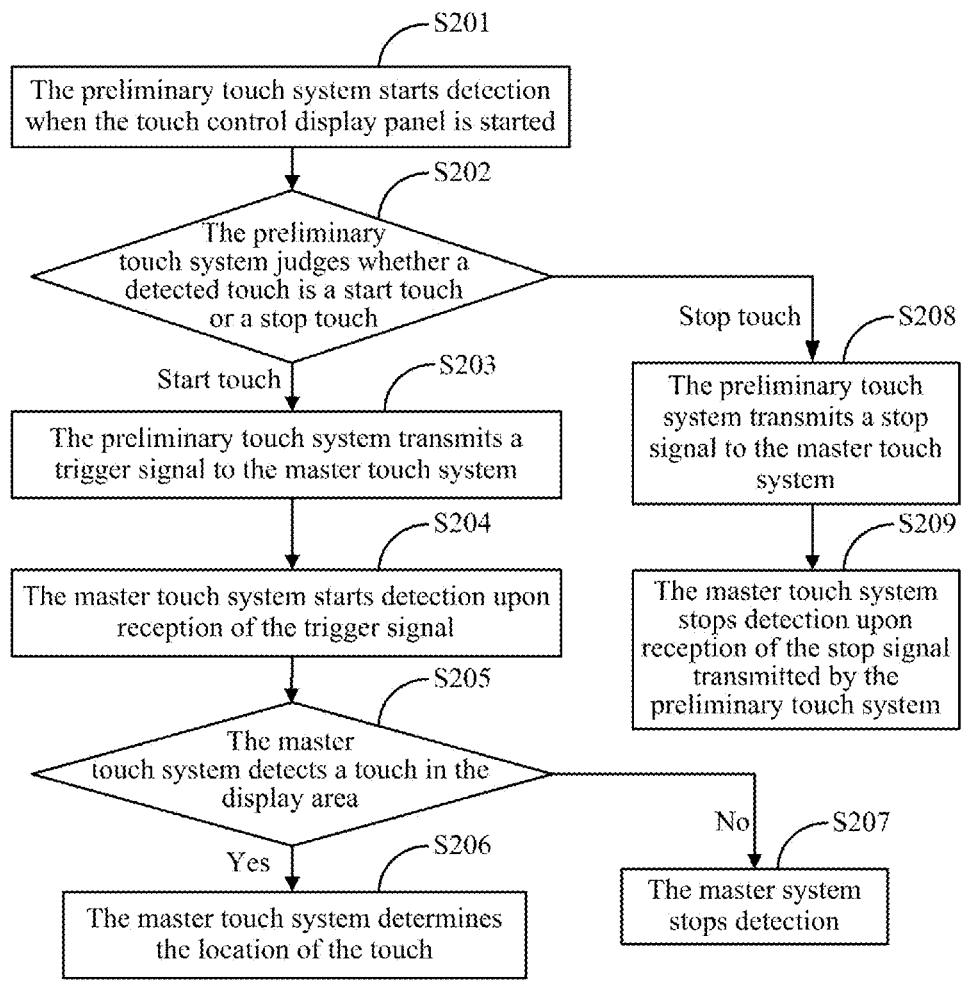
FIG. 14 illustrates a schematic flow chart of a touch control method of a touch control display panel according to another preferred embodiment of the disclosure.

As illustrated in FIG. 14, another preferred embodiment of the disclosure provides a more particular method for driving a touch control display panel, the method particularly including:

S201. The preliminary touch system starts detection when the touch control display panel is started;

S202. The preliminary touch system judges whether a detected touch is a start touch or a stop touch, and If it is a start touch, then the flow proceeds to the operations S203 to S207, and if it is a stop touch, then the flow proceeds to the operations S208 and S209;

S203. The preliminary touch system transmits a trigger signal to the master touch system;

S204. The master touch system starts detection upon reception of the trigger signal;

S205. The master touch system detects a touch in the display area, and

If so, then the flow proceeds to the operation S206; otherwise, then the flow proceeds to the operation S207;

S206. The master touch system determines the location of the touch;

S207. The master system stops detection;

S208. The preliminary touch system transmits a stop signal to the master touch system; and S209. The master touch system stops detection upon reception of the stop signal transmitted by the preliminary touch system.

In the touch control method according to the embodiments of the disclosure, the preliminary touch system judges the master touch system to be started and stopped, and when the preliminary touch system detects a start touch, it indicates an incoming touch action likely to act on the display area of the touch control display panel, so the master touch system starts detection; and when the preliminary touch system detects a stop touch, it indicates that a touch action acting in the display area of the touch control display panel has come to the end, so the master touch system stops detection. The master touch system and the preliminary touch system can cooperate to thereby greatly lower power consumption of the touch control display panel.

Figure 15:
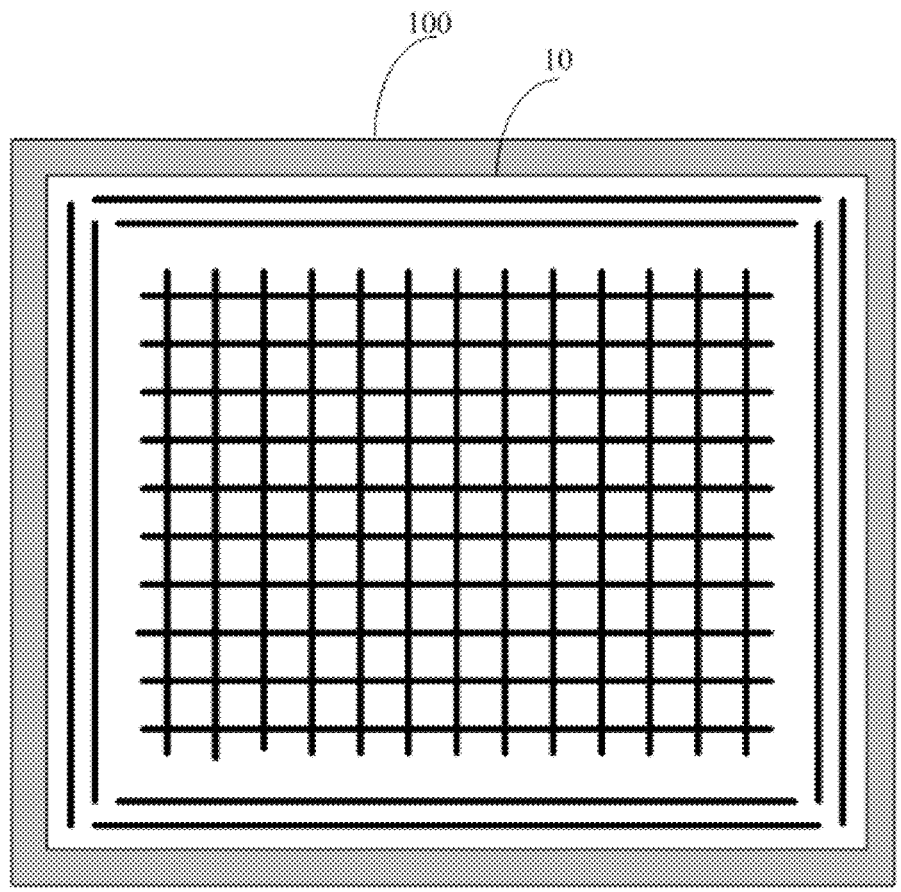
FIG. 15 illustrates a schematic structural diagram of a touch control display device according to another preferred embodiment of the disclosure.

Based upon the same inventive idea, another preferred embodiment of the disclosure provides a touch control display device 100, as illustrated in FIG. 15, including any one of the touch control display panels 10 according to the embodiments illustrated in FIG. 1 to FIG. 12, and the touch control display device 100 can be a handset, a tablet PC, a TV set, a display, a digital photo frame, a navigator and any other product or component capable of touch display.

Reference can be made to the embodiments of the touch control display panel above for an implementation of the touch control display device, so a repeated description thereof will be omitted here.

In the touch control display panel and the touch control method thereof, and the touch control display device, above according to the embodiment of the disclosure, the touch control display panel includes the preliminary touch system and the master touch system, and the master touch system, as in the prior art, includes the master touch electrodes, located in the display area, configured to detect a touch in the display area of the touch control display panel; and the preliminary touch system includes the preliminary touch electrodes, located in at least either of the part of the display area and the non-display area, configured to detect a touch in at least either of the part of the display area and the non-display area of the touch control display panel. Due to a smaller range of detection by, and consequentially low power consumption of, the preliminary touch system, the preliminary touch system and the master control system can operate in cooperation with each other so that after the touch control display panel is started, firstly the preliminary touch system with lower power consumption detects a touch, and then the master touch system with higher power consumption will not be started into operation until a touch is detected by the preliminary touch system, thus lowering power consumption of the touch control display panel.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A touch control display panel, comprising:
   a display area including a central area and a peripheral area surrounding the central area;
   a non-display area surrounding the display area;
   a preliminary touch system comprising a plurality of preliminary touch electrodes located in at least either of the peripheral area of the display area and the non-display area, configured to detect whether there is a touch in at least either of the peripheral area of the display area and the non-display area; and
   a master touch system comprising a plurality of master touch electrodes located in the display area, wherein the master touch electrodes are configured to detect whether there is a touch in the display area, wherein when a preliminary touch electrode is located in the peripheral area of the display area, the preliminary touch electrode is electrically insulated from the plurality of master touch electrodes.

2. The touch control display panel of claim 1, wherein the preliminary touch system is configured to transmit a trigger signal which causes the master touch system to start detection, and to transmit a stop signal which causes the master touch system to stop detection.

3. The touch control display panel of claim 2, wherein:
   when the touch control display panel is started, the preliminary touch electrodes start detection;
   if any one of the preliminary touch electrodes detects a start touch, the preliminary touch system transmits a trigger signal to the master touch system;
   if any one of the preliminary touch electrodes detects a stop touch, the preliminary touch system transmits a stop signal to the master touch system;
   the master touch electrodes start detection in response to the trigger signal transmitted by the preliminary touch system;
   if any one of the master touch electrodes detects a touch, a location of the touch is determined; and
   the detecting master touch electrodes stop detection in response to the stop signal transmitted by the preliminary touch system.

4. The touch control display panel of claim 1 wherein:
   the preliminary touch system comprises at least two preliminary touch electrodes located on each of upper, lower, left and right sides of the non-display area, and the at least two preliminary touch electrodes on each of the sides are parallel to and insulated from the corresponding sides; and
   the preliminary touch electrodes are self-capacitive electrodes.

5. The touch control display panel of claim 1 wherein:
   the preliminary touch system comprises at least two looped preliminary touch electrodes, located in the non-display area and surrounding the display area; and
   the preliminary touch electrodes are self-capacitive electrodes.

6. The touch control display panel of claim 1 wherein:
   the preliminary touch system comprises at least two preliminary touch electrodes located on each of upper, lower, left and right sides of the peripheral area of the display area, and the at least two preliminary touch electrodes on each of the sides are parallel to and insulated from the corresponding sides; and
   the preliminary touch electrodes are self-capacitive electrodes.

7. The touch control display panel of claim 1 wherein
   the preliminary touch system comprises at least two looped preliminary touch electrodes located in the peripheral area of the display area and surrounding the central area of the display area; and the preliminary touch electrodes are self-capacitive electrodes.

8. The touch control display panel of claim 1 wherein the preliminary touch system comprises preliminary touch electrodes in at least two columns of master touch electrodes located on each of upper, lower, left and right sides of the peripheral area of the display area and parallel to the corresponding sides; and before the master touch system is started, the preliminary touch electrodes are self-capacitive electrodes.

9. The touch control display panel of claim 1 wherein the preliminary touch electrodes comprise self-capacitive first preliminary touch electrodes and second preliminary touch electrodes, and the preliminary touch system comprises:

at least one first preliminary touch electrode located on each of upper, lower, left and right sides of the non-display area and parallel to the corresponding sides; or at least one looped first preliminary touch electrode located in the non-display area and surrounding the display area, and at least one second preliminary touch electrode located on each of upper, lower, left and right sides of the peripheral area of the display area and parallel to the corresponding sides; or at least one looped second preliminary touch electrode located in the peripheral area of the display area and surrounding the central area of the display area; or a plurality of second preliminary touch electrodes in at least one columns of master touch electrodes located on each of upper, lower, left and right sides of the peripheral area of the display area and parallel to the corresponding sides, and before the master touch system is started, the second preliminary touch electrodes are self-capacitive electrodes.

10. A touch control method of a touch control display panel, the touch control display panel comprising:

a display area including a central area and a peripheral area surrounding the central area;

a non-display area surrounding the display area;

a preliminary touch system comprising a plurality of preliminary touch electrodes located in at least either of the peripheral area of the display area and the non-display area, configured to detect whether there is a touch in at least either of the peripheral area of the display area and the non-display area; and a master touch system comprising a plurality of master touch electrodes located in the display area, wherein the master touch electrodes are configured to detect whether there is a touch in the display area, wherein when a preliminary touch electrode is located in the peripheral area of the display area, the preliminary touch electrode is electrically insulated from the plurality of master touch electrodes, the touch control method comprising:

when the touch control display panel is started, starting detection by the preliminary touch system;

if the preliminary touch system detects a start touch, transmitting, by the preliminary touch system, a trigger signal to the master touch system;

starting detection by the master touch system in response to the trigger signal; and if the master touch system detects a touch in the display area, determining by the master touch system a location of the touch.

11. The touch control method of claim 10, further comprising starting detection by the preliminary touch system from the time the touch control display panel is started until the touch control display panel is powered off.

12. The touch control method of claim 11, further comprising stopping detection in response to the master touch system detecting no touch in the display area.

13. The touch control method of claim 11, further comprising:

while the master touch system is detecting, transmitting a stop signal to the master touch system in response to the preliminary touch system detecting a touch; and stopping detection by the master touch system in response to the stop signal transmitted by the preliminary touch system.

14. The touch control method of claim 13, wherein:

the preliminary touch electrodes are located in the non-display area; and the start touch is a touch sliding from outside to inside of the non-display area; or the preliminary touch electrodes are located in a peripheral area of the display area, and the start touch is a touch sliding from outside to inside of the peripheral area; or the preliminary touch electrodes are located in the non-display area and in the peripheral area of the display area, and the start touch is a touch sliding from outside the non-display area to inside the peripheral area of the display area.

15. The touch control method of claim 13, wherein:

the preliminary touch electrodes are located in the non-display area, and the stop touch is a touch sliding from inside to outside of the non-display area; or the preliminary touch electrodes are located in a peripheral area of the display area, and the stop touch is a touch sliding from inside to outside of the peripheral area; or the preliminary touch electrodes are located in the non-display area and in the peripheral area of the display area, and the stop touch is a touch sliding from inside the non-display area to outside the peripheral area.

16. A touch control display device, comprising a touch control display panel, the touch control display panel comprising a display area including a central area and a peripheral area surrounding the central area;

a non-display area surrounding the display area;

a preliminary touch system comprising a plurality of preliminary touch electrodes located in at least either of the peripheral area of the display area and the non-display area, configured to detect whether there is a touch in at least either of the peripheral area of the display area and the non-display area; and a master touch system comprising a plurality of master touch electrodes located in the display area, wherein the master touch electrodes are configured to detect whether there is a touch in the display area, wherein when a preliminary touch electrode is located in the peripheral area of the display area, the preliminary touch electrode is electrically insulated from the plurality of master touch electrodes.

* * * * *